(12) United States Patent
Bates et al.

(10) Patent No.: US 7,999,984 B2
(45) Date of Patent: Aug. 16, 2011

(54) APPARATUS AND METHOD TO ENCODE INFORMATION HOLOGRAPHICALLY

(75) Inventors: Allen Keith Bates, Tucson, AZ (US);
Nils Haustein, Soergenloch (DE); Craig Anthony Klein, Tucson, AZ (US);
Henry Zheng Liu, Tucson, AZ (US);
Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 690 days.

(21) Appl. No.: 11/864,675

(22) Filed: Sep. 28, 2007

(65) Prior Publication Data

US 2009/0086299 A1    Apr. 2, 2009

(51) Int. Cl.
*G02B 5/32* (2006.01)
*G03H 1/04* (2006.01)
(52) U.S. Cl. ............................................ 359/21; 359/35
(58) Field of Classification Search .................. 359/9, 21
See application file for complete search history.

(56) References Cited

U.S. PATENT DOCUMENTS

| | | | |
|---|---|---|---|
| 5,777,760 A * | 7/1998 | Hays et al. | 359/7 |
| 5,978,112 A | 11/1999 | Psaltis et al. | |
| 6,064,586 A | 5/2000 | Snyder et al. | |
| 6,243,334 B1 | 6/2001 | Hasegawa et al. | |
| 6,272,095 B1 | 8/2001 | Liu et al. | |
| 6,788,443 B2 | 9/2004 | Ayres et al. | |
| 2004/0194151 A1 * | 9/2004 | Earhart | 725/135 |

* cited by examiner

*Primary Examiner* — Stephone B Allen
*Assistant Examiner* — Jade R Chwasz
(74) *Attorney, Agent, or Firm* — Dale F. Regelman; Quarles & Brady LLP

(57) ABSTRACT

A method to encode information holographically, wherein the method provides information, and generates a plurality of data images, wherein each data image comprises a portion of the information. The method holographically encodes each of the plurality of data images in a holographic data storage medium, generates a plurality of identifiers, and associates a different one of the plurality of identifiers with a different one of the plurality of data images. The method forms a directory image reciting each of plurality of identifiers, encodes the directory image in a non-holographic data storage medium, and holographically encodes the directory image in the holographic data storage medium.

7 Claims, 17 Drawing Sheets

APPARATUS AND METHOD TO ENCODE INFORMATION HOLOGRAPHICALLY

FIELD OF THE INVENTION

This invention relates to an apparatus, and method using that apparatus, to encode information holographically.

BACKGROUND OF THE INVENTION

In holographic information storage, an entire page of information is stored at once as an optical interference pattern within a thick, photosensitive optical material. This is done by intersecting two coherent laser beams within the storage material. The first, called the data beam, contains the information to be stored; the second, called the reference beam, is designed to be simple to reproduce—for example, a simple collimated beam with a planar wavefront.

The resulting optical interference pattern, of the two coherent laser beams, causes chemical and/or physical changes in the photosensitive medium: a replica of the interference pattern is stored as a change in the absorption, refractive index, or thickness of the photosensitive medium. When the stored interference pattern is illuminated with one of the two waves that was used during recording, some of this incident light is diffracted by the stored interference pattern in such a fashion that the other wave is reconstructed. Illuminating the stored interference pattern with the reference wave reconstructs the data beam, and vice versa.

A large number of these interference patterns can be superimposed in the same thick piece of media and can be accessed independently, as long as they are distinguishable by the direction or the spacing of the patterns. Such separation can be accomplished by changing the angle between the object and reference wave or by changing the laser wavelength. Any particular data page can then be read out independently by illuminating the stored patterns with the reference wave that was used to store that page. Because of the thickness of the hologram, this reference wave is diffracted by the interference patterns in such a fashion that only the desired object beam is significantly reconstructed and imaged on an electronic camera. The theoretical limits for the storage density of this technique are on the order of tens of terabits per cubic centimeter.

SUMMARY OF THE INVENTION

Applicants' invention comprises a method to encode information holographically. The method provides information, and generates a plurality of data images, wherein each data image comprises a portion of the information. The method holographically encodes each of the plurality of data images in a holographic data storage medium, generates a plurality of identifiers, and associates a different one of the plurality of identifiers with a different one of the plurality of data images. The method forms a directory image reciting each of plurality of identifiers, encodes the directory image in a non-holographic data storage medium, and holographically encodes the directory image in the holographic data storage medium.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1A:
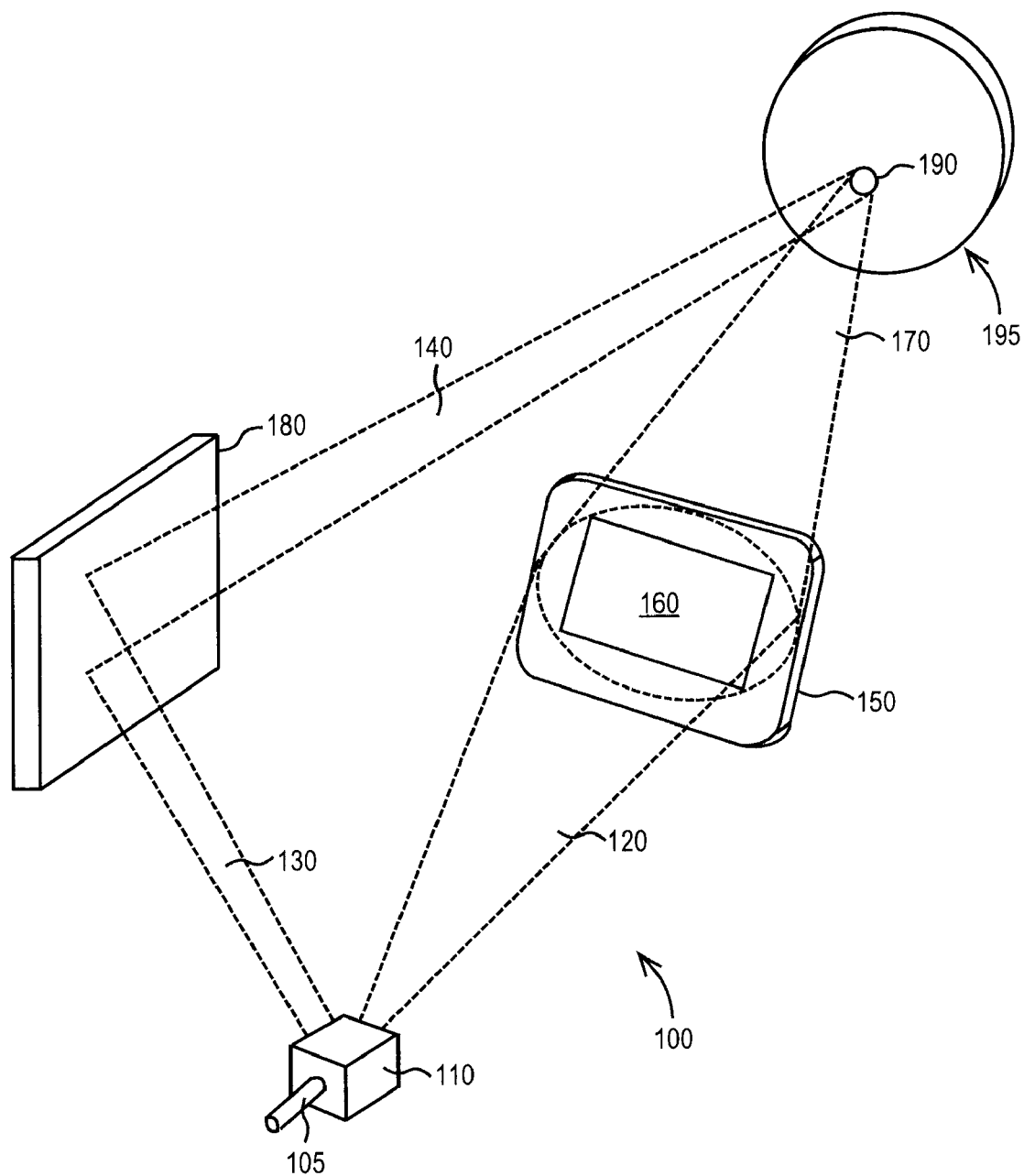
FIG. 1A is a perspective view of a portion of one embodiment of Applicants' holographic data storage system.

FIG. 1A illustrates a holographic data storage system 100. System 100 comprises a lasing device 105, a laser splitter 110, carrier beam 120, and reference beam 130. In the illustrated embodiment of FIG. 1A, system 100 further comprises a transmissive spatial light modulator ("TSLM") 150, a data beam 170, a mirror 180, and a holographic data storage medium 195.

In certain embodiments, TSLM 150 comprises an LCD-type device. The TSLM 150 is typically translucent, where information is represented by either a light or a dark pixel on the TSLM 150 display. Laser light originating from the laser source 105 is split by the beam splitter 110 into two beams, a carrier beam 120 and a reference beam 130.

The carrier beam 120 picks up the image 160 displayed by the TSLM 150 as the light passes through the TSLM 150. Reference beam 130 is reflected by the mirror 180 to produce reflected reference beam 140. Reflected reference beam 140 interferes with the data beam 170 to form a hologram. That hologram is encoded into holographic data storage medium 195 as interference pattern 190.

Figure 1B:
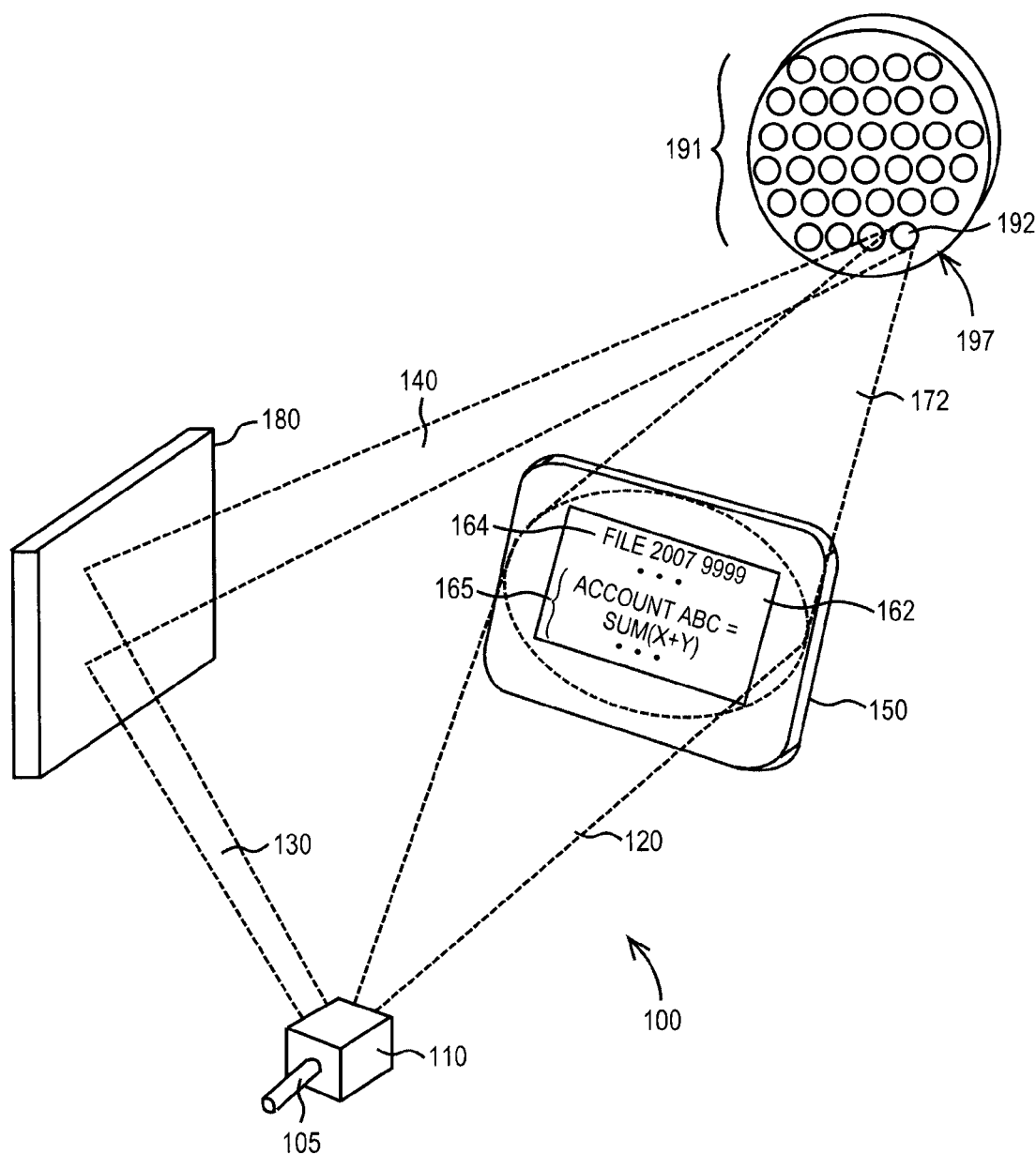
FIG. 1B illustrates the holographic data storage system of FIG. 1 being used to encoded a data image.

FIG. 1B shows data image 162 displayed on TSLM 150, wherein data image 162 recites information 165 and identifier 164 associated with information 165. Carrier beam 172 comprising data image 162 interacts with reference beam 140 to form a hologram that is encoded in holographic data storage medium 197 as interference pattern 192. In the illustrated embodiment of FIG. 1B, holographic data storage medium 197 comprises a plurality of data images holographically encoded therein as plurality of interference patterns 191, wherein data image 164 holographically encoded as interference pattern 192 comprises one of plurality 191.

Figure 1C:
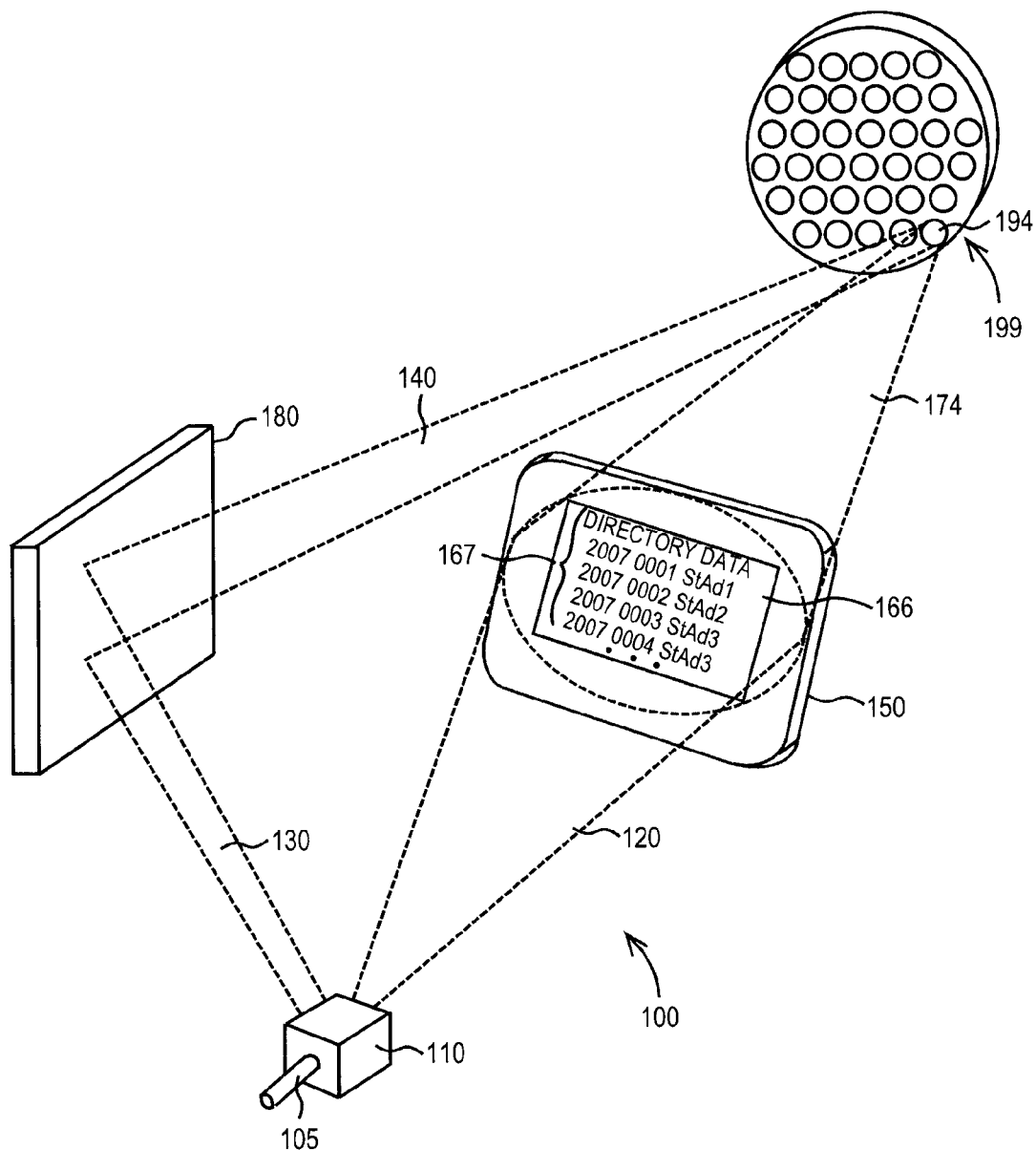
FIG. 1C illustrates the holographic data storage system of FIG. 1 being used to encoded a directory image.

Referring now to FIG. 1C, in certain embodiments, Applicants' method generates a directory image, wherein that directory image recites the identifiers for each data image holographically encoded in a holographic data storage medium, such as data storage medium 199. FIG. 1C shows directory image 166 being displayed on TSLM 150. Directory image 166 contains directory image directory information 167. Carrier beam 174 comprising directory image 166 interacts with reference beam 140 to form a hologram that is encoded in holographic data storage medium 199 as interference pattern 194. In the illustrated embodiment of FIG. 1C, holographic data storage medium 199 comprises a plurality of data images holographically encoded therein as plurality of interference patterns 191, and a directory image holographically encoded therein as interference pattern 194.

Figure 2:
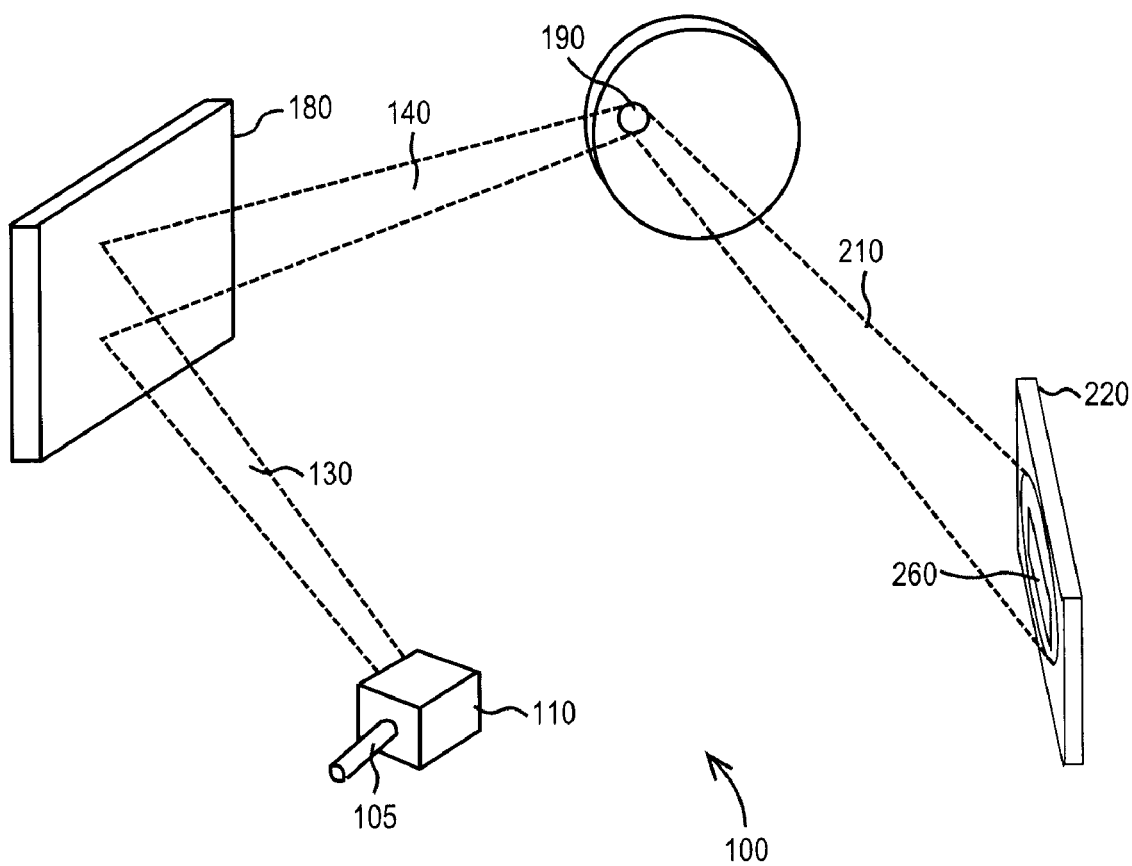
FIG. 2 is a perspective view showing a holographically encoded image being illuminated using the holographic data storage system of FIG. 1 with a reference beam to generate a reconstructed data beam.
Figure 7:
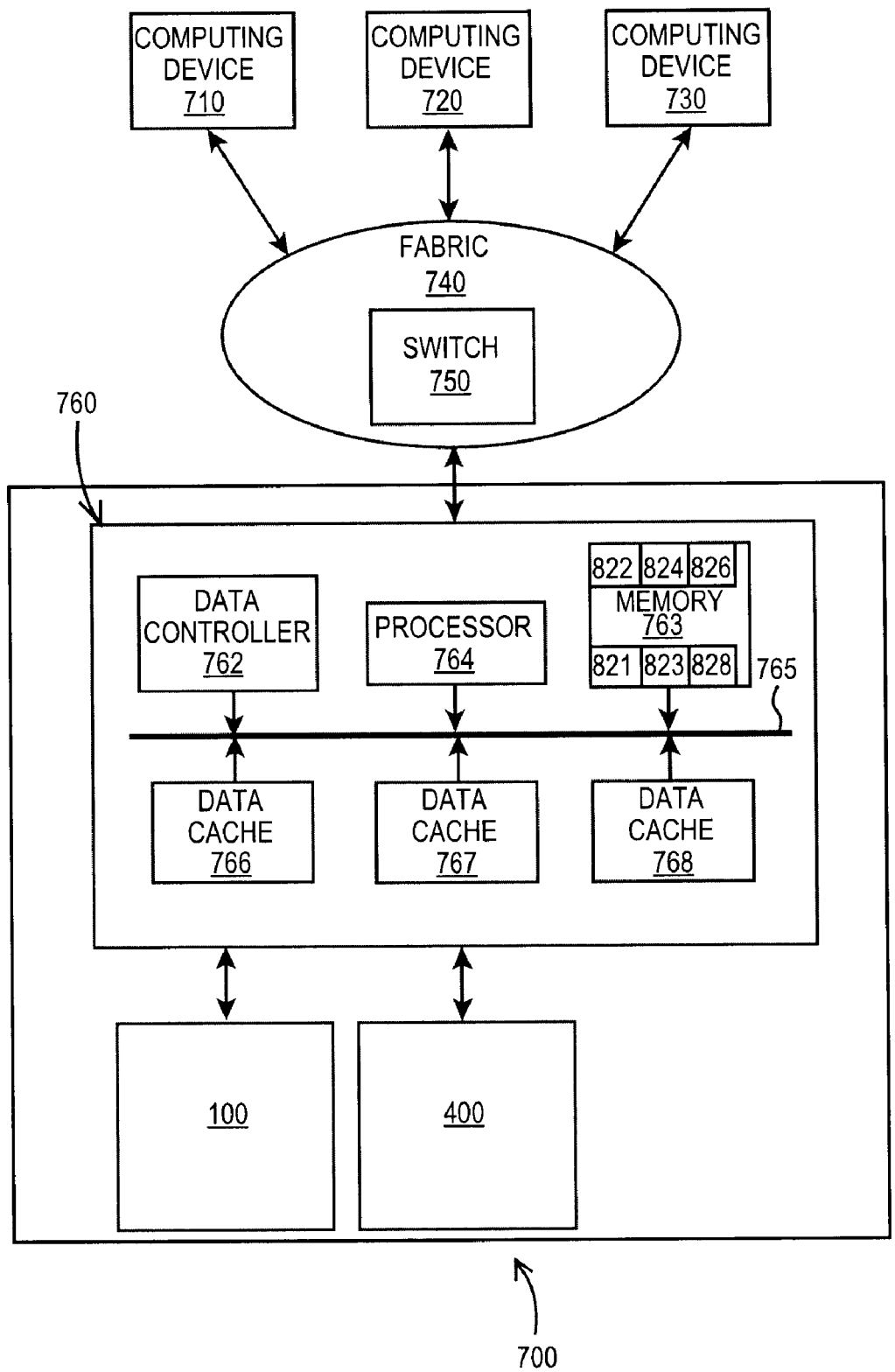
FIG. 7 is a block diagram illustrating Applicants' storage controller.

Referring now to FIG. 2, illuminating interference pattern 190 with reference beam 140 generates a reconstructed data beam 210, wherein reconstructed data beam 210 comprises an image 260 resembling the original data image 160 (FIG. 1A). Reconstructed data image 260 is projected onto optical detector 220. Optical detector 220 captures reconstructed data image 260. In certain embodiments, optical detector 220 provides that captured reconstructed data image 260 to a storage controller, such as storage controller 760 (FIG. 7).

Similarly, illuminating interference pattern 192 (FIG. 1B) with reference beam 140 generates a reconstructed data beam comprising a data image resembling the original data image 162 (FIG. 1B). The reconstructed data image is projected onto optical detector 220. Optical detector 220 and/or storage controller 760 abstracts from the reconstructed data image information 165 (FIG. 1B) and identifier 164 (FIG. 1B). Illuminating interference pattern 194 (FIG. 1C) with reference beam 140 generates a reconstructed data beam comprising a directory image resembling the original directory image 166 (FIG. 1B). The reconstructed data image is projected onto optical detector 220. Optical detector 220 and/or storage controller 760 abstracts from the reconstructed directory image directory information 167 (FIG. 1C).

Figure 3:
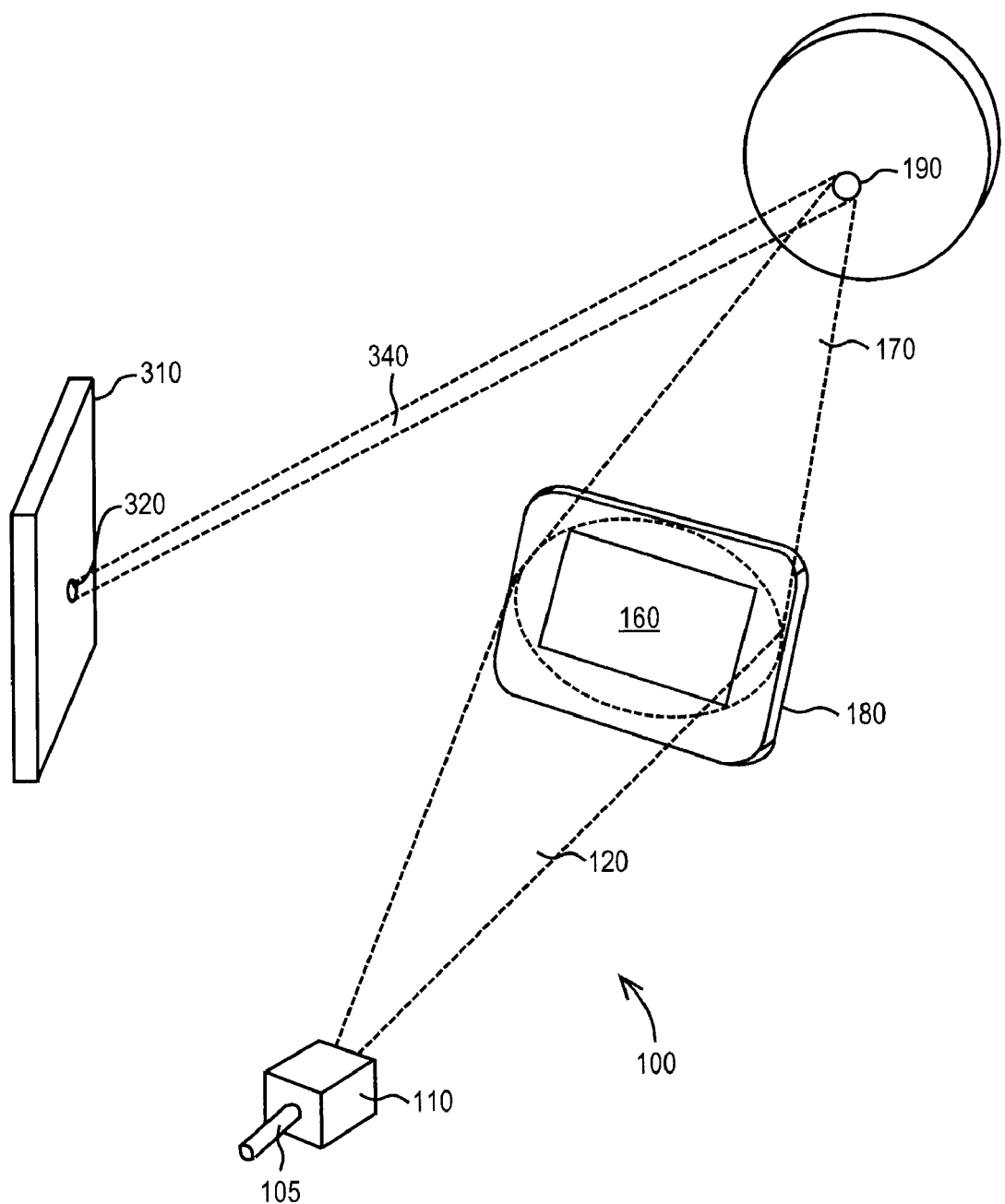
FIG. 3 is a perspective view showing a holographically encoded image being illuminated using the holographic data storage system of FIG. 1 with a carrier beam to generate a reconstructed reference beam.

Referring now to FIG. 3, illuminating interference pattern 190 with carrier beam 170 generates a reconstructed reference beam 340. In the illustrated embodiment of FIG. 3, reconstructed reference beam 340 is projected onto optical detector 310. Reconstructed reference beam 340 is the equivalent of reference beam 140, FIG. 1A. Optical detector 310 measures an intensity 320 for reconstructed reference beam 340.

Figure 4:
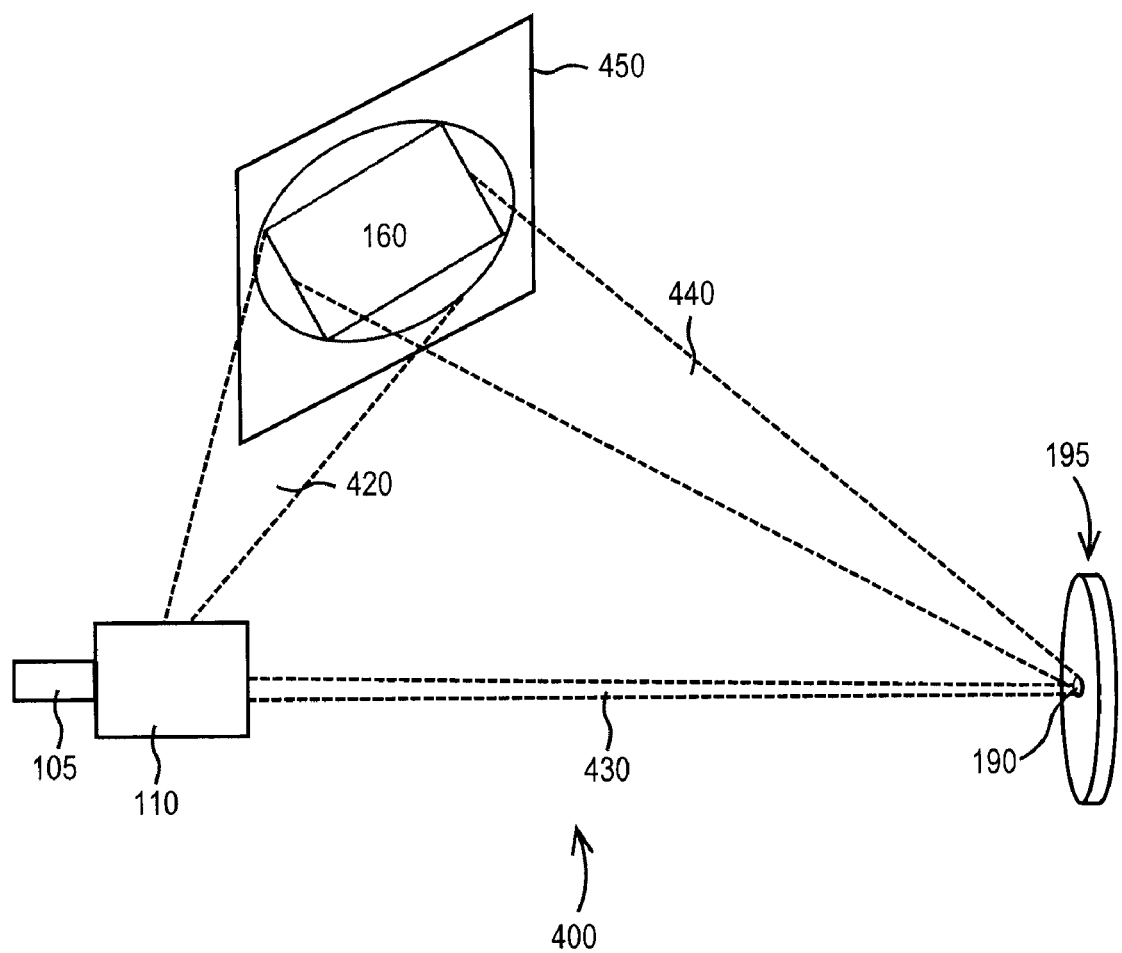
FIG. 4 is a perspective view of a portion of a second embodiment of Applicants' holographic data storage system.

Referring now to FIG. 4, in certain embodiments Applicants' apparatus comprises a reflective spatial light modulator ("RSLM"), such as TSLM 450. In the illustrated embodiment of FIG. 4, image 160 is shown displayed on reflective spatial light modulator ("RSLM") 450. In certain embodiments, RSLM 450 comprises an assembly comprising a plurality of micro mirrors. In other embodiments, RSLM 450 comprises a liquid crystal on silicon ("LCOS") display device. In contrast to nematic twisted liquid crystals used in Liquid Crystal Displays ("LCDs"), in which the crystals and electrodes are sandwiched between polarized glass plates, LCOS devices have the liquid crystals coated over the surface of a silicon chip. The electronic circuits that drive the formation of the image are etched into the chip, which is coated with a reflective (aluminized) surface. The polarizers are located in the light path both before and after the light bounces off the chip. LCOS devices are easier to manufacture than conventional LCD displays. LCOS devices have higher resolution because several million pixels can be etched onto one chip. LCOS devices can be much smaller than conventional LCD displays.

Carrier beam 420 picks up image 160 as the light is reflected off RSLM 450 to form reflected data beam 440 comprising image 160. Unreflected reference beam 430 interferes with data beam 440 to form a hologram. That hologram is formed within storage medium 195 thereby causing the photo-active storage medium to create interference pattern 190.

As those skilled in the art will appreciate, apparatus 400 can be used to display data image 162 (FIG. 1B) on RSLM 450, wherein carrier beam 420 picks up data image 162 as the light is reflected off RSLM 450 to form a data beam 440 analogous to data beam 172 (FIG. 1B) comprising data image 162. Unreflected reference beam 430 interferes with the data beam 440 analogous to data beam 172 to form a hologram comprising data image 162. That hologram can be formed within holographic data storage medium 197 (FIG. 1B) thereby causing the photo-active storage medium to create interference pattern 192.

As those skilled in the art will further appreciate, apparatus 400 can be used to display directory image 166 (FIG. 1C) on RSLM 450, wherein carrier beam 420 picks up directory image 166 as the light is reflected off RSLM 450 to form a data beam 440 analogous to data beam 174 (FIG. 1B) comprising directory image 162. Unreflected reference beam 430 interferes with that data beam 440 analogous to data beam 174 to form a hologram comprising data image 166. That hologram can be formed within storage medium 199 (FIG. 1C) thereby causing the photo-active storage medium to create interference pattern 194.

Figure 5:
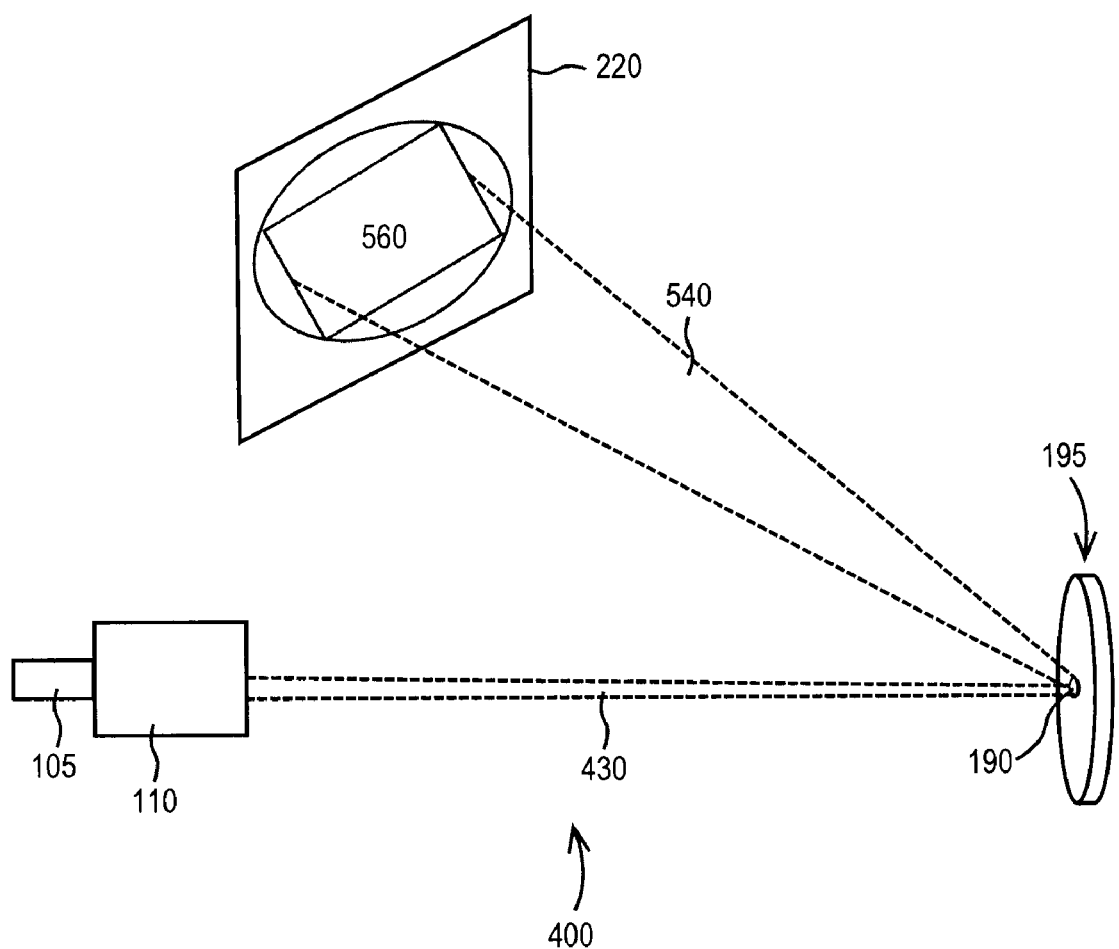
FIG. 5 is a perspective view illustrating a holographically encoded image being illuminated using the holographic data storage system of FIG. 4 with a reference beam to generate a reconstructed data beam.

FIG. 5 shows reference beam 430 directed toward encoded holographic storage medium 195 such that reference beam 430 is diffracted by the interference pattern 190 to form reconstructed data beam 540 which comprises an reconstructed image 560 similar to image 160. Reconstructed Image 560 is projected onto optical detector 220. Optical detector 220 then captures the information comprising image 560.

Figure 6:
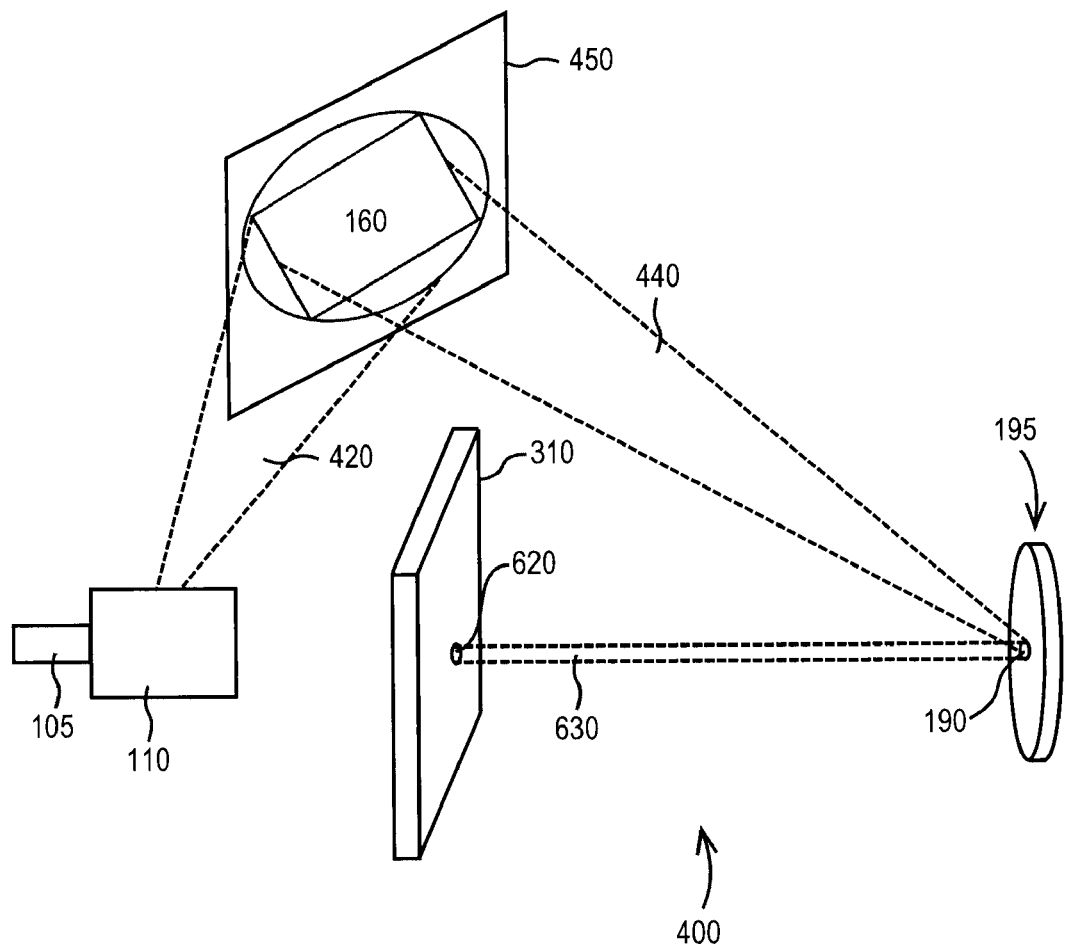
FIG. 6 is a perspective view illustrating a holographically encoded image being illuminated using the holographic data storage system of FIG. 4 with a carrier beam to generate a reconstructed reference beam.

Referring now to FIG. 6, illuminating interference pattern 190 with carrier beam 440 generates a reconstructed reference beam 630. In the illustrated embodiment of FIG. 6, reconstructed reference beam 630 is projected onto optical detector 310. Optical detector 310 measures an intensity 620 for reconstructed reference beam 630, which is analogous to reference beam 430.

FIG. 7 illustrates one embodiment of Applicants' holographic data storage and retrieval system 700. In the illustrated embodiment of FIG. 7, holographic data storage and retrieval system 700 communicates with computing devices 710, 720, and 730. In the illustrated embodiment of FIG. 7, computing devices 710, 720, and 730 communicate with storage controller 760 through a data communication fabric 740. In certain embodiments, fabric 740 comprises one or more data switches 750. Further in the illustrated embodiment of FIG. 7, storage controller 760 communicates with one or more holographic encoding/decoding systems. In the illustrated embodiment of FIG. 7, holographic data storage and retrieval system 700 comprises holographic data storage system 100 (FIGS. 1A, 1B, 1C, 2, 3) and/or holographic data storage system 400 (FIGS. 4, 5, 6).

In certain embodiments, computing devices 710, 720, and 730, are selected from the group consisting of an application server, a web server, a work station, a host computer, or other like device from which information is likely to originate. In certain embodiments, one or more of computing devices 710, 720, and/or 730 are interconnected with fabric 640 using Small Computer Systems Interface ("SCSI") protocol running over a Fibre Channel ("FC") physical layer. In other embodiments, the connections between computing devices 710, 720, and 730, comprise other protocols, such as Infiniband, Ethernet, Fibre Channel over Ethernet, SAS, SATA, or Internet SCSI ("iSCSI"). In certain embodiments, switches 750 are configured to route traffic from the computing devices 710, 720, and/or 730, directly to the storage controller 760.

In the illustrated embodiment of FIG. 7, storage controller 760 comprises a data controller 762, memory 763, processor 764, and data caches 766, 767, and 768, wherein these components communicate through a data bus 765. In the illustrated embodiment of FIG. 7, threshold correlation factor 821, microcode 822, threshold intensity ratio 823, instructions 824, directory 826, and directory image 828, are written to memory 763. Processor 764 uses microcode 822 to operate storage controller 760.

In certain embodiments, memory 763 comprises a magnetic information storage medium, an optical information storage medium, an electronic information storage medium, and the like. By "magnetic storage medium," Applicants mean, for example, a device such as a hard disk drive, floppy disk drive, or magnetic tape. By "optical information storage medium," Applicants mean, for example, a Digital Versatile Disk ("DVD"), High-Definition DVD ("HD-DVD"), Blu-Ray Disk ("BD"), Magneto-Optical ("MO") disk, Phase-Change "(PC") disk, etc. By "electronic storage media," Applicants mean, for example, a device such as a PROM, EPROM, EEPROM, Flash PROM, compactflash, smartmedia, and the like. In certain embodiments, memory 768 comprises a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

In certain embodiments, the storage controller 760 is configured to read data signals from and write data signals to a serial data bus on one or more of the computing devices 710, 720, and/or 730. Alternatively, in other embodiments the storage controller 760 is configured to read data signals from and write data signals to one or more of the computing devices 710, 720, and/or 730, through the data bus 765 and the fabric 740.

In certain embodiments, storage controller 760 converts a serial data stream into a convolution encoded data images. Those data images are transferred to RSLM 450 (FIG. 4) and/or TSLM 150 (FIGS. 1A, 1B, 1C) disposed in one or more of holographic data storage systems 100 (FIGS. 1A, 1B, 1C, 2, 3) and/or 400 (FIGS. 4, 5, 6).

In certain embodiments, holographic encoding/decoding systems 100 and 400 are located in different geographical places. In certain embodiments, storage controller 760 distributes information between two or more holographic encoding/decoding systems 100 and 400 in order to protect the information.

Figure 11:
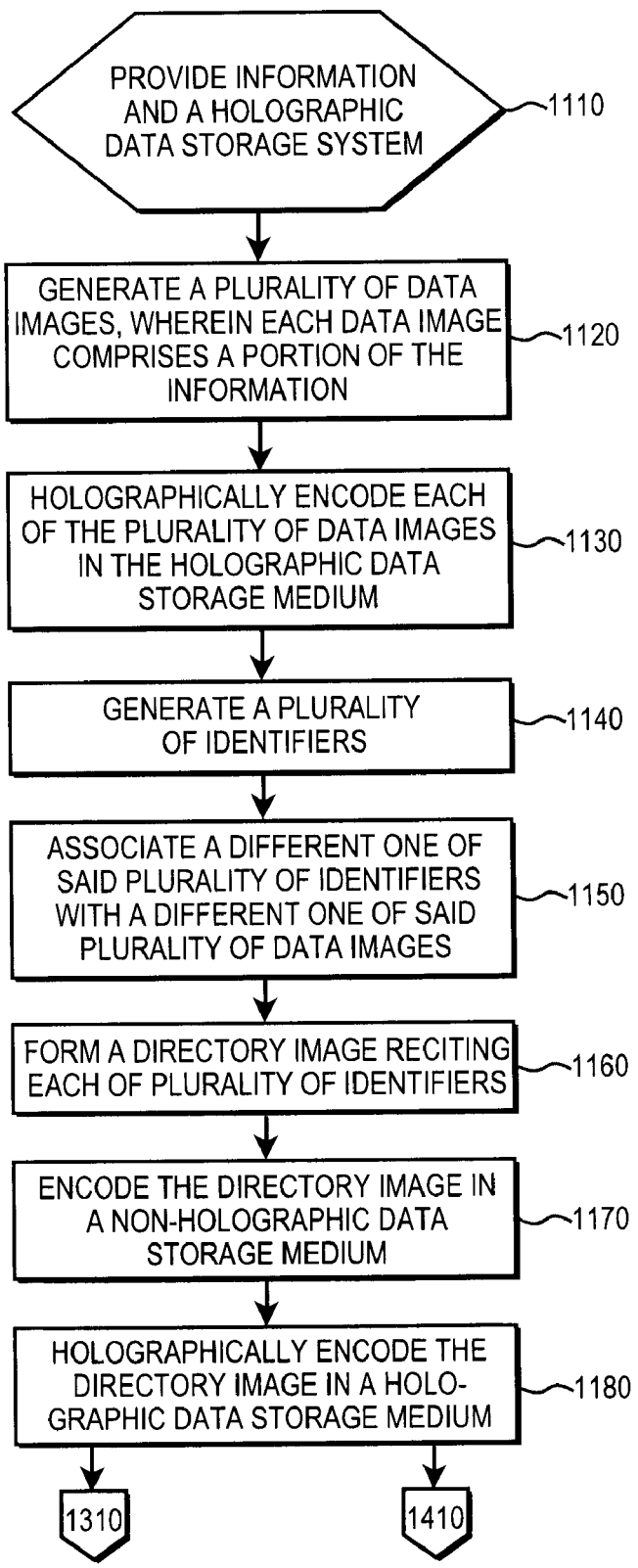
FIG. 11 summarizes certain steps of Applicants' method.

Applicants' invention comprises a method to encode information holographically. FIGS. 11, 12, 13, and 14, summarize the steps of Applicants' invention. Referring now to FIG. 11, in step 1110 the method provides information and a holographic data storage system, such as system 100, system 400, or system 700.

In step 1120, the method generates a plurality of data images, wherein each of those data images comprises a portion of the information of step 1110. In certain embodiments, step 1110 is performed by a storage controller, such as Applicants' storage controller 760 (FIG. 7). In certain embodiments, step 1120 is performed by a host computer in communication with a storage controller.

In step 1130, the method holographically encodes in a holographic data storage medium each of the plurality of data images of step 1120. In certain embodiments, step 1130 is performed by a storage controller, such as Applicants' storage controller 760 (FIG. 7). In certain embodiments, step 1130 is performed by a host computer in communication with a storage controller.

In step 1140, the method generates a plurality of identifiers. In certain embodiments, step 1140 is performed by a storage controller, such as Applicants' storage controller 760 (FIG. 7). In certain embodiments, step 1140 is performed by a host computer in communication with a storage controller.

In step 1150, the method associates a different one of the identifiers of step 1140 with a different one of the plurality of data images of step 1120. In certain embodiments, step 1150 further comprises generating a directory, such as directory 826 (FIG. 7), associating a different one of the identifiers of step 1140 with a different one of the plurality of data images of step 1120. In certain embodiments, step 1150 is performed by a storage controller, such as Applicants' storage controller 760 (FIG. 7). In certain embodiments, step 1150 is performed by a host computer in communication with a storage controller.

In step 1160, the method forms an image of the directory of step 1150. In certain embodiments, step 1160 is performed by a storage controller, such as Applicants' storage controller 760 (FIG. 7). In certain embodiments, step 1160 is performed by a host computer in communication with a storage controller.

In step 1170, the method encodes the directory image of step 1160 in a non-holographic data storage medium. In certain embodiments, in step 1170 the method saves the directory image of step 1160 in memory disposed in a storage controller, such as for example directory image 828 (FIG. 7) written to memory 763 (FIG. 7) disposed in storage controller 760 (FIG. 7). In certain embodiments, step 1170 is performed by a storage controller, such as Applicants' storage controller 760 (FIG. 7). In certain embodiments, step 1170 is performed by a host computer in communication with a storage controller.

In step 1180, the method holographically encodes the directory image of step 1160 in the same holographic data storage medium as used in step 1130 to holographically encode the plurality of data images of step 1120. For example, FIG. 1C shows directory image 166 encoded in holographic data storage medium 199 as interference pattern 194. In certain embodiments, step 1180 is performed by a storage controller, such as Applicants' storage controller 760 (FIG. 7). In certain embodiments, step 1180 is performed by a host computer in communication with a storage controller.

Figure 12:
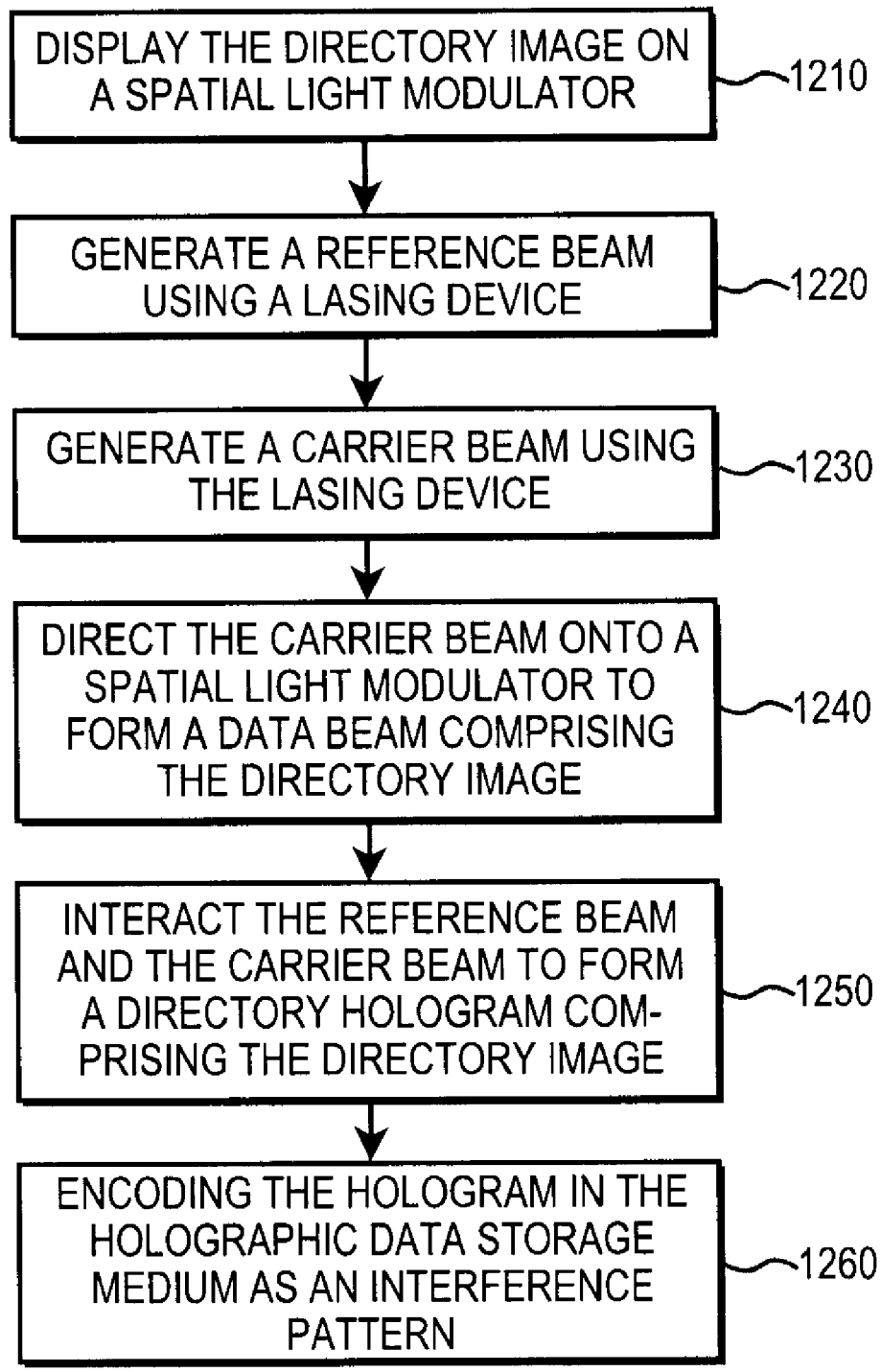
FIG. 12 summarizes certain additional steps of Applicants' method.

In certain embodiments, step 1180 utilizes the steps recited in FIG. 12. Referring now to FIG. 12, in step 1210 the method displays the directory image of step 1160 on a spatial light modulator. In certain embodiments, the spatial light modulator of step 1210 comprises a transmissive spatial light modulator. In certain embodiments, the spatial light modulator of step 1210 comprises reflective spatial light modulator. In certain embodiments, step 1210 is performed by a storage controller, such as Applicants' storage controller 760 (FIG. 7). In certain embodiments, step 1210 is performed by a host computer in communication with a storage controller.

In step 1220, the method generates a reference beam using a lasing device, wherein that reference beam comprises an original reference beam intensity. In certain embodiments, step 1220 is performed by a storage controller, such as Applicants' storage controller 760 (FIG. 7). In certain embodiments, step 1220 is performed by a host computer in communication with a storage controller.

In step 1230, the method generates a carrier beam using a lasing device. In certain embodiments, step 1230 is performed by a storage controller, such as Applicants' storage controller 760 (FIG. 7). In certain embodiments, step 1230 is performed by a host computer in communication with a storage controller.

In step 1240, the method directs the carrier beam of step 1230 onto the spatial light modulator of step 1210 to form a data beam comprising the directory image. In certain embodiments, step 1240 is performed by a storage controller, such as Applicants' storage controller 760 (FIG. 7). In certain embodiments, step 1240 is performed by a host computer in communication with a storage controller.

In step 1250, the method interacts the reference beam of step 1220 with the data beam of step 1240 to form a directory hologram comprising the directory image. In step 1260, the method encodes the directory hologram in the holographic data storage medium as an interference pattern, such as interference pattern 194 (FIG. 1C).

In certain embodiments, Applicants' method verifies the holographically encoded directory image of step 1180 (FIG. 11). In certain embodiments, Applicants' method illuminates the holographically encoded directory image of step 1180 with the reference beam of step 1220 (FIG. 12) using the verification algorithm of FIG. 13. In certain embodiments, Applicants' method illuminates the holographically encoded directory image of step 1180 with the data beam of step 1240 (FIG. 12) using the verification algorithm of FIG. 14. In certain embodiments, Applicants' method requires that the holographically encoded directory image of step 1180 be verified using the verification algorithms of both FIGS. 13 and 14. In certain embodiment Applicants' method allows the user to configure the verification algorithms according to FIGS. 13 and 14.

Figure 13:
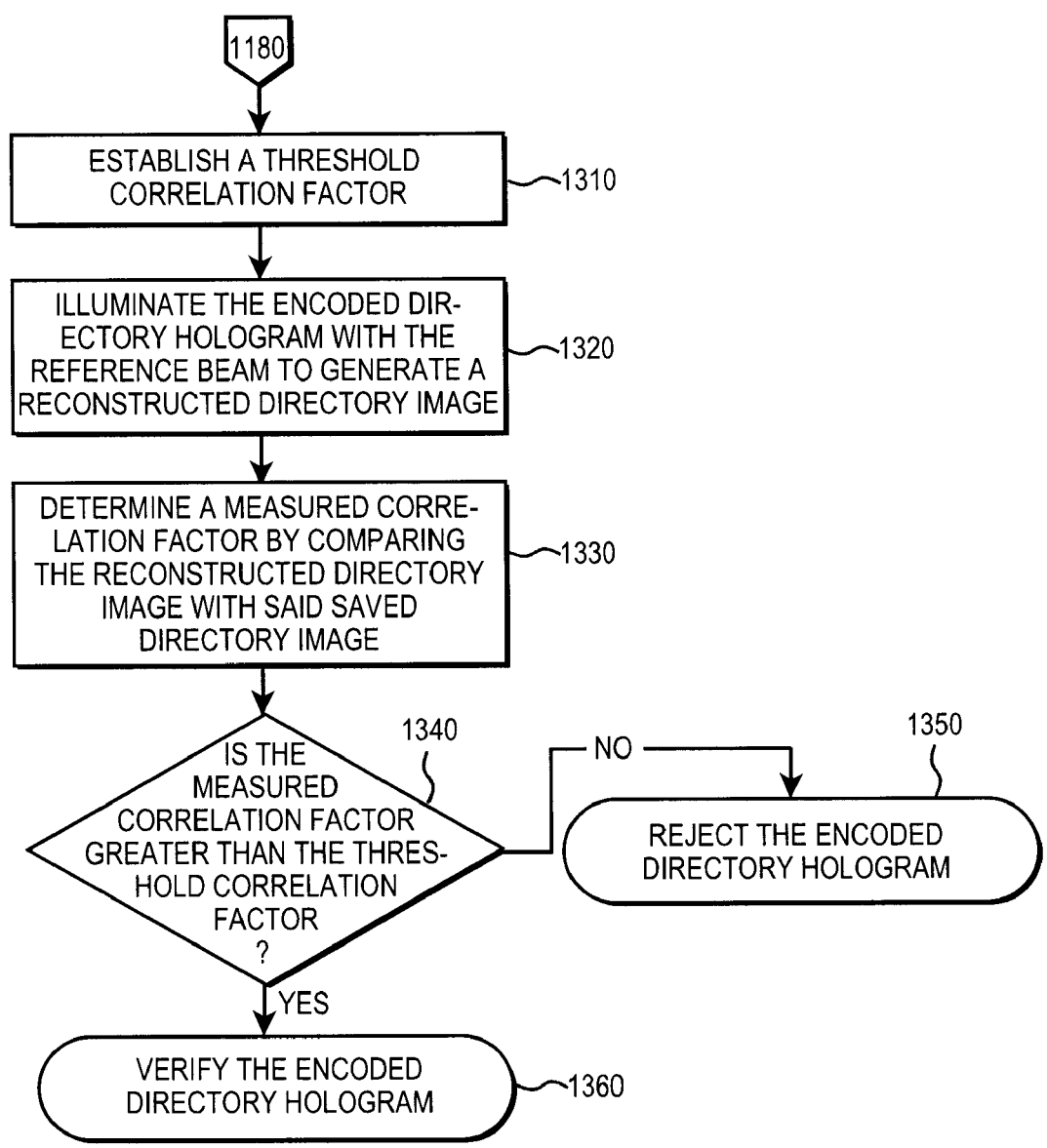
FIG. 13 summarizes certain additional steps of Applicants' method.

Referring now to FIG. 13, in step 1310 the method establishes a threshold correlation factor. The threshold correlation factor of step 1310 quantifies the required overlap between a reconstructed directory image and a stored directory image. In certain embodiments, step 1320 is performed by a storage controller, such as Applicants' storage controller 760 (FIG. 7). In certain embodiments, step 1320 is performed by a host computer in communication with a storage controller.

In step 1320, the method illuminates the holographically encoded directory image of step 1180 with the reference beam of step 1220 to generate a reconstructed directory image. In certain embodiments, step 1320 is performed by a storage controller, such as Applicants' storage controller 760 (FIG. 7). In certain embodiments, step 1320 is performed by a host computer in communication with a storage controller.

In step 1330 the method determines a measured correlation factor by comparing the reconstructed directory image of step 1320 with the saved directory image of step 1170 (FIG. 11). In certain embodiments, step 1330 is performed by a storage controller, such as Applicants' storage controller 760 (FIG. 7). In certain embodiments, step 1330 is performed by a host computer in communication with a storage controller.

In certain embodiments, in step 1330 Applicants' method calculates the difference between the reconstructed directory image $g(x,y)$ and impulse response $h(x,y)=s^*(-x,-y)$ of the saved directory image. Referring now to Equation (1), $V(x,y)$ comprises the cross-correlation between the reconstructed directory image, and $s(x,y)$ for the saved directory image. As those skilled in the art will appreciate, Equation (1) comprises a double integral, meaning that the integration is over the X axis and Y axis directions of the input screen portion of the optical detector used to capture the reconstructed directory image. Additionally, $\xi$ is the integration variable along that X axis, $\eta$ is the integration variable along that Y axis, and * denotes a complex conjugate.

$$V(x,y)=\iint g(\xi,\eta)s^*(\xi-x,\eta-y)d\xi d\eta \quad (1)$$

Mathematically, $V(x,y)$ comprises a surface varying along the X axis and the Y axis, for each $(x,y)$. There is one value of $V(x,y)$ for each detector element in detector 510. In certain embodiments, the range $V(x,y)$ for each $(x,y)$ is between $-1$ and $+1$, wherein $+1$ represents the ideal correlation of one hundred (100%).

In certain embodiments, $V(x,y)$ is evaluated point-by-point. In other embodiments, Applicants have found it advantageous to quantify surface $V(x,y)$ in terms of a single number, i.e. a correlation factor. In certain embodiments, the measured correlation factor of step 1330 comprises a MAX_V(x,y) which is equal to the maximum value of $V(x,y)$. In other embodiments, the measured correlation factor of step 1330 comprises an AM_V(x,y) comprising the arithmetic mean of the values of $V(x,y)$. In still other embodiments, the measured correlation factor of step 1330 comprises a GM_V(x,y) comprising the geometric mean of the values of $V(x,y)$. In yet other embodiments, the measured correlation factor of step 1330 comprises an RMS_V(x,y) comprising the root-mean-square of the values of $V(x,y)$.

In step 1340, the method determines if measured correlation factor of step 1330 is greater than the threshold correlation factor of step 1310. In certain embodiments, step 1340 is performed by a storage controller, such as Applicants' storage controller 760 (FIG. 7). In certain embodiments, step 1340 is performed by a host computer in communication with a storage controller.

If the method in step 1340 determines that the measured correlation factor of step 1330 is not greater than the threshold correlation factor of step 1310, then the method transitions from step 1340 to step 1350 wherein the method rejects the holographically encoded directory image of step 1180. In certain embodiments, step 1350 is performed by a storage controller, such as Applicants' storage controller 760 (FIG. 7). In certain embodiments, step 1350 is performed by a host computer in communication with a storage controller.

In certain embodiments, step 1350 further comprises overwriting the rejected holographically encoded directory image of step 1180. In certain embodiments, step 1350 further comprises overwriting the rejected holographically encoded directory image of step 1180 with a holographically encoded image indicating that the holographically encoded directory image should not be used. In certain embodiments, the holographically encoded image indicating that the holographically encoded directory image should not be used comprises a totally black image. In certain embodiments, the holographically encoded image indicating that the holographically encoded directory image should not be used comprises the word DELETED.

Alternatively, if the method in step 1340 determines that the measured correlation factor of step 1330 is greater than the threshold correlation factor of step 1310, then the method transitions from step 1340 to step 1360 wherein the method verifies the holographically encoded directory image of step 1180. In certain embodiments, step 1360 is performed by a storage controller, such as Applicants' storage controller 760 (FIG. 7). In certain embodiments, step 1360 is performed by a host computer in communication with a storage controller.

Figure 14:
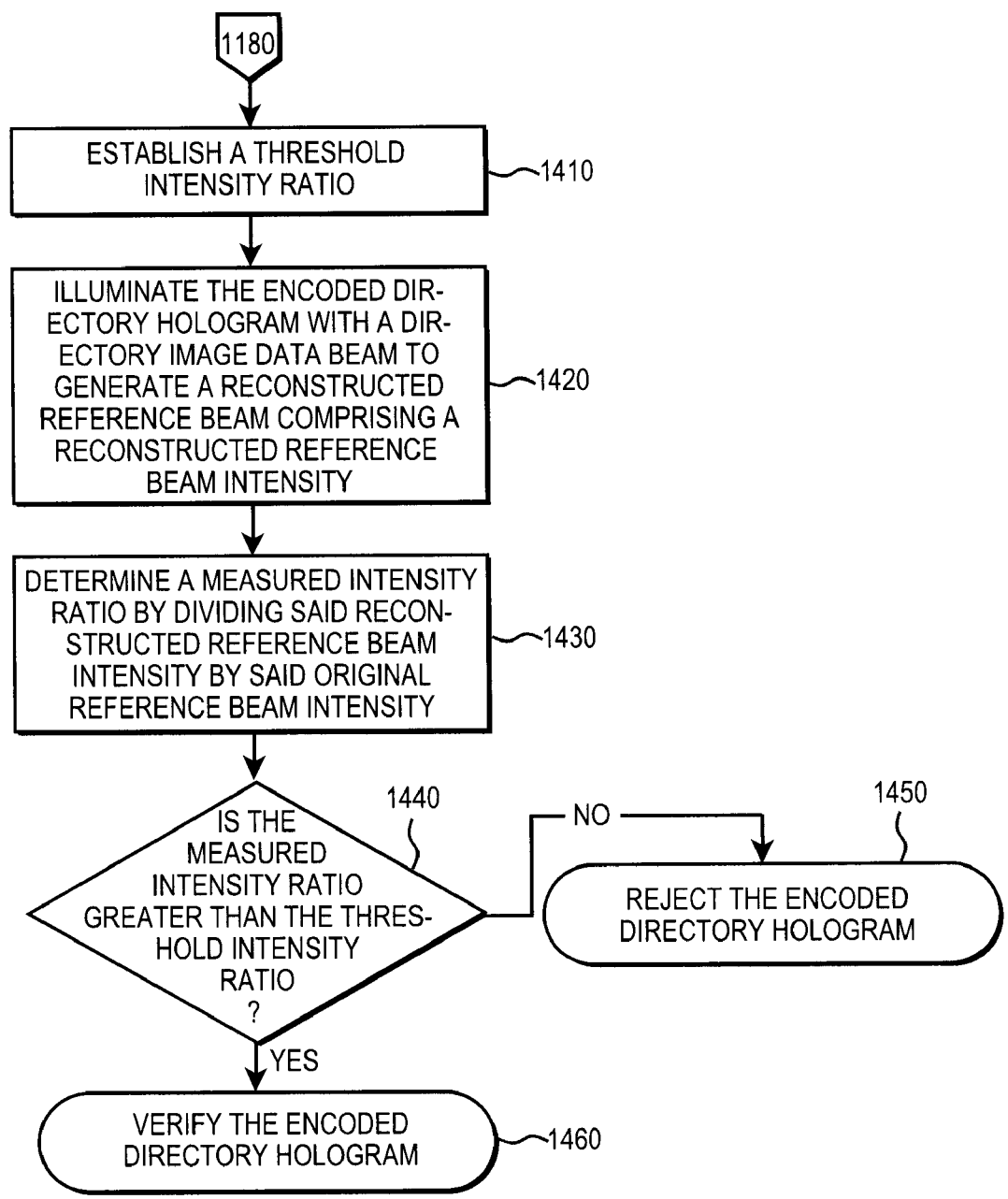
FIG. 14 summarizes certain additional steps of Applicants' method.

Referring now to FIG. 14, in step 1410 the method establishes a threshold intensity ratio. In certain embodiments, step 1410 is performed by a storage controller, such as Applicants' storage controller 760 (FIG. 7). In certain embodiments, step 1410 is performed by a host computer in communication with a storage controller.

In step 1420, the method illuminates the holographically encoded directory image of step 1180 with the data beam of step 1240 to generate a reconstructed reference beam comprising a reconstructed data beam intensity. In certain embodiments, step 1420 is performed by a storage controller, such as Applicants' storage controller 760 (FIG. 7). In certain embodiments, step 1420 is performed by a host computer in communication with a storage controller.

In step 1430 the method determines a measured intensity ratio by dividing the reconstructed reference beam intensity of step 1420 with the original reference beam intensity of step 1220 (FIG. 12). In certain embodiments, step 1430 is performed by a storage controller, such as Applicants' storage controller 760 (FIG. 7). In certain embodiments, step 1430 is performed by a host computer in communication with a storage controller.

In step 1440, the method determines if measured intensity ratio of step 1430 is greater than the threshold intensity ratio of step 1410. In certain embodiments, step 1440 is performed by a storage controller, such as Applicants' storage controller 760 (FIG. 7). In certain embodiments, step 1440 is performed by a host computer in communication with a storage controller.

If the method in step 1440 determines that the measured intensity ratio of step 1430 is not greater than the threshold intensity ratio of step 1410, then the method transitions from step 1440 to step 1450 wherein the method rejects the holographically encoded directory image of step 1180.

In certain embodiments, step 1450 further comprises overwriting the rejected holographically encoded directory image of step 1180. In certain embodiments, step 1450 further comprises overwriting the rejected holographically encoded directory image of step 1180 with a holographically encoded image indicating that the holographically encoded directory image should not be used. In certain embodiments, the holographically encoded image indicating that the holographically encoded directory image should not be used comprises a totally black image. In certain embodiments, the holographically encoded image indicating that the holographically encoded directory image should not be used comprises the word DELETED.

Alternatively, if the method in step 1440 determines that the measured intensity ratio of step 1430 is greater than the threshold intensity ratio of step 1410, then the method transitions from step 1440 to step 1460 wherein the method verifies the holographically encoded directory image of step 1180. In certain embodiments, step 1460 is performed by a storage controller, such as Applicants' storage controller 760 (FIG. 7). In certain embodiments, step 1460 is performed by a host computer in communication with a storage controller.

Figure 15:
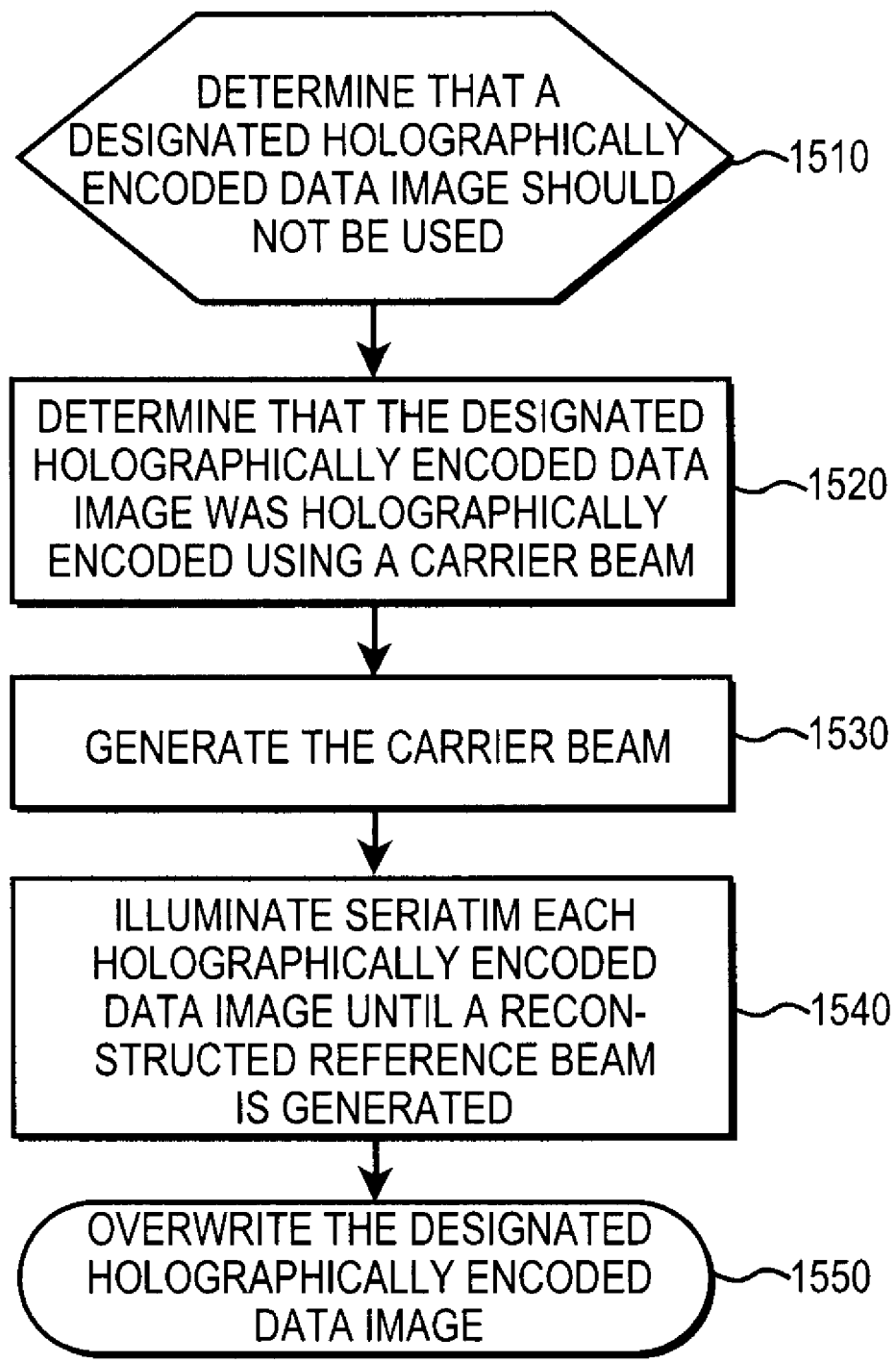
FIG. 15 summarizes certain additional steps of Applicants' method.

In certain embodiments of Applicants' method, the information of step of step 1110 is subsequently updated in whole or in part. In these embodiments, Applicants' method overwrites one or more holographically encoded data images to indicate that those one or more data images should not be used. Referring now to FIG. 15, in step 1510 the method determines that a designated holographically encoded data image should not be used. In certain embodiments, step 1510 comprises receiving a message from a host computer that a designated holographically encoded data image should not be used.

In step 1520, the method determines that the designated holographically encoded data image of step 1510 was encoded using a carrier beam comprising a designated data image. In certain embodiments, step 1510 is performed by a storage controller, such as Applicants' storage controller 760 (FIG. 7). In certain embodiments, step 1510 is performed by a host computer in communication with a storage controller.

In step 1530, Applicants' method generates a carrier beam comprising the designated data image of step 1520. In certain embodiments, step 1530 is performed by a storage controller, such as Applicants' storage controller 760 (FIG. 7). In certain embodiments, step 1530 is performed by a host computer in communication with a storage controller.

In certain embodiments, step 1540 comprises illuminating seriatim each data image holographically encoded in a holographic data storage medium with the carrier beam of step 1530. When an illuminated holographically encoded data image generates a reconstructed reference beam, then the method determines that the designated holographically encoded data image of step 1510 has been located. In certain embodiments, if an illuminated holographically encoded data image generates a reconstructed reference beam, then the method determines if that reconstructed reference beam exceeds a pre-determined threshold intensity level. In these embodiments, if the reconstructed reference beam exceeds the pre-determined threshold intensity level, then the method determines that the designated holographically encoded data image of step 1510 has been located.

In certain embodiments, step 1540 comprises determining a storage address for the designated holographically encoded data image using the directory image stored in a non-holographic data storage medium in step 1170 (FIG. 11). In other embodiments, step 1540 comprises determining a storage address for the designated holographically encoded data image using the directory image stored in a holographic data storage medium in step 1180 (FIG. 11).

In these embodiments using a stored directory image, the method in step 1540 illuminates a holographically encoded data image disposed at the storage address with the carrier beam of step 1530. If the illuminated holographically encoded data image disposed at the storage address generates a reconstructed reference beam, then the method confirms that the designated holographically encoded data image of step 1510 has been located.

In step 1550, the method overwrites the designated holographically encoded data image. In certain embodiments, step 1550 further comprises overwriting the designated holographically encoded data image with a holographically encoded image indicating that the holographically encoded directory image should not be used. In certain embodiments, the holographically encoded image indicating that the designated holographically encoded data image should not be used comprises a totally black image. In certain embodiments, the holographically encoded image indicating that the designated holographically encoded data image should not be used comprises the word DELETED.

Figure 8:
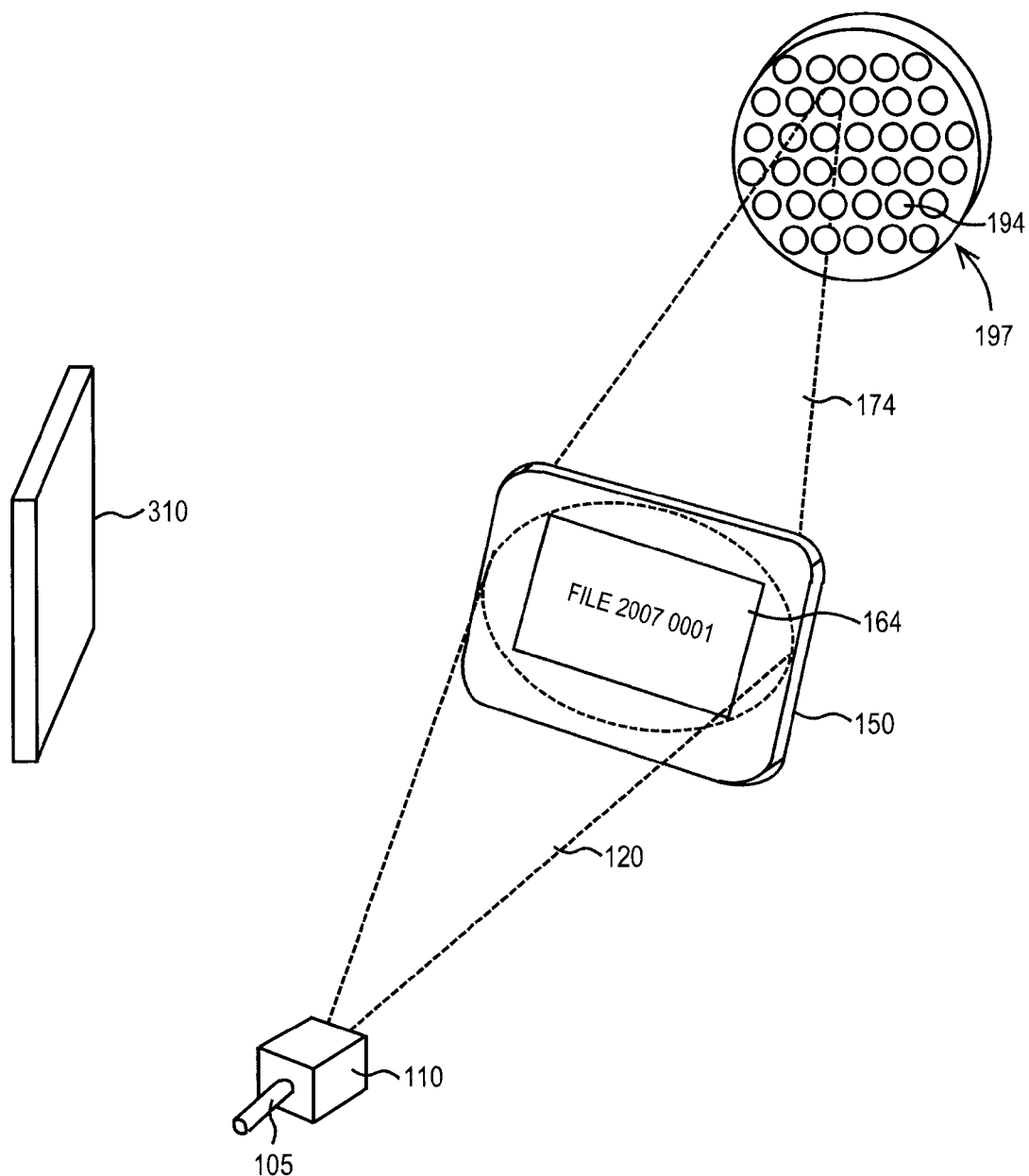
FIG. 8 illustrates a holographically encoded data image being illuminated with a carrier beam, wherein that holographically encoded data image does not generate a reconstructed reference beam.
Figure 9:
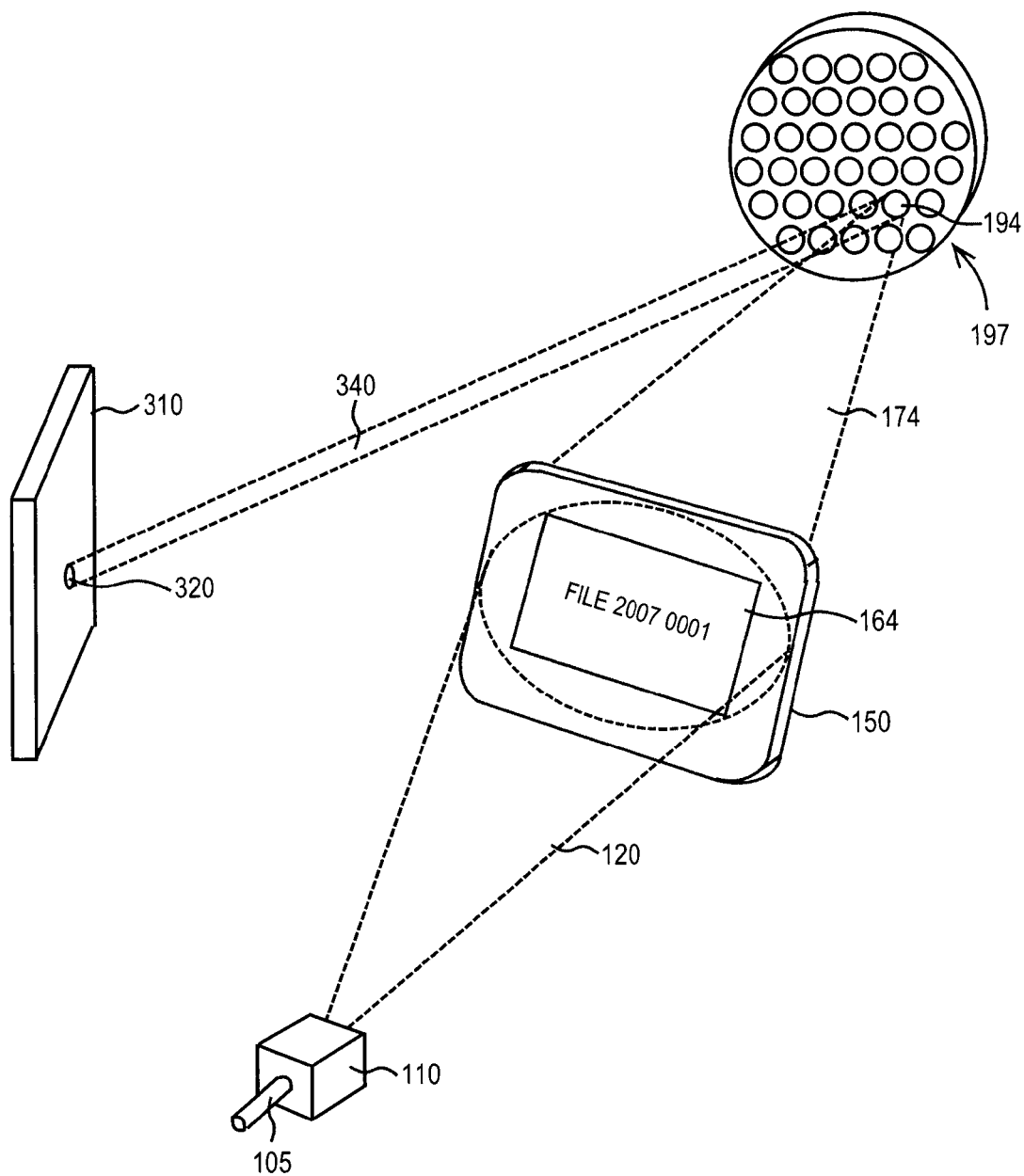
FIG. 9 illustrates a holographically encoded data image being illuminated with a carrier beam, wherein that holographically encoded data image does generate a reconstructed reference beam.
Figure 10:
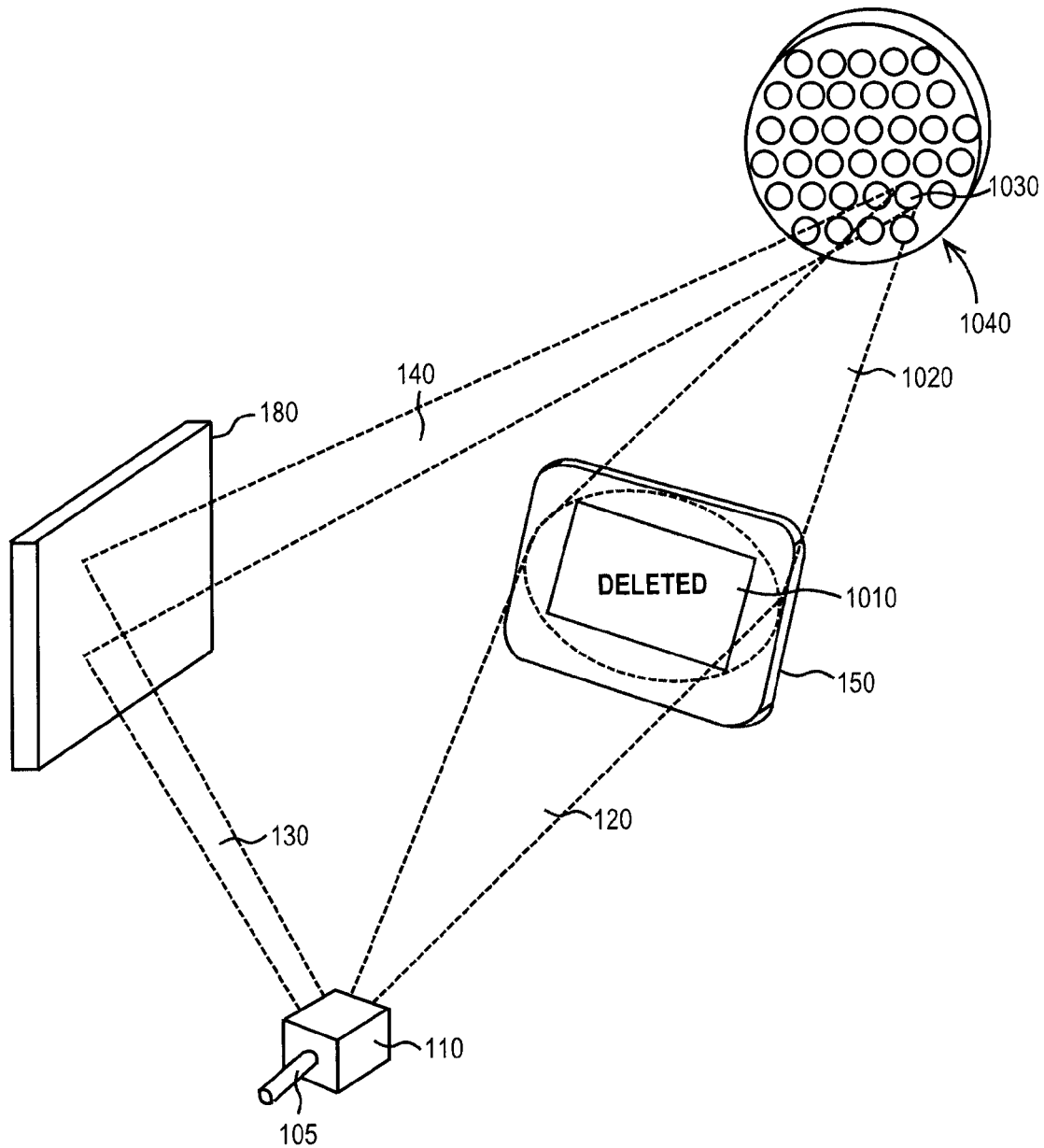
FIG. 10 illustrates a holographically encoded date image being overwritten with a carrier beam comprising an image comprising the word DELETED.

For example and referring now to FIGS. 8, 9, and 10, if the method determines in step 1510 that FILE 2007 0001 should not be used, wherein that data image was holographically encoded using data image 164, and wherein that data image comprises holographically encoded data image 194, then as shown in FIG. 8 illuminating a holographically encoded data image other than holographically encoded data image 194 does not generate a reconstructed reference beam. However as shown in FIG. 9, illuminating holographically encoded data image 194 with carrier beam 174 comprising data image 164, generates reconstructed reference beam 340 comprising an intensity 320. FIG. 10 shows the holographically encoded data image 194 of FIG. 9 being overwritten by carrier beam 1020 comprising DELETED image 1010 to give overwritten holographically encoded data image 1030 disposed in holographic data storage medium 1040.

In certain embodiments, individual steps recited in FIGS. 11, 12, 13, 14, and/or 15, may be combined, eliminated, or reordered.

In certain embodiments, Applicants' invention includes instructions, such as instructions 824 (FIG. 7) residing memory 763 (FIG. 7), where those instructions are executed by a processor, such as 764 (FIG. 7), to perform one or more of steps 1120, 1130, 1140, 1150, 1160, 1170, and/or 1180, recited in FIG. 11, and/or one or more of steps 1210, 1220, 1230, 1240, 1250, and/or 1260, recited in FIG. 12, and/or one or more of steps 1310, 1320, 1330, 1340, 1350, and/or 1360, recited in FIG. 13, and/or one or more of steps 1410, 1420, 1430, 1440, 1450, and/or 1460, recited in FIG. 14, and/or one or more of steps 1510, 1520, 1530, 1540, and/or 1550, recited in FIG. 15.

In other embodiments, Applicants' invention includes instructions residing in any other computer program product, where those instructions are executed by a computer external to, or internal to, system 100, or system 400, or to system 700, to perform one or more of steps 1120, 1130, 1140, 1150, 1160, 1170, and/or 1180, recited in FIG. 11, and/or one or more of steps 1210, 1220, 1230, 1240, 1250, and/or 1260, recited in FIG. 12, and/or one or more of steps 1310, 1320, 1330, 1340, 1350, and/or 1360, recited in FIG. 13, and/or one or more of steps 1410, 1420, 1430, 1440, 1450, and/or 1460, recited in FIG. 14, and/or one or more of steps 1510, 1520, 1530, 1540, and/or 1550, recited in FIG. 15. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to encode information holographically, comprising the steps of:
   providing information and a holographic data storage system;
   generating a plurality of data images, wherein each data image comprises a portion of said information;
   holographically encoding each of said plurality of data images in a holographic data storage medium;
   generating a plurality of identifiers;
   associating a different one of said plurality of identifiers with a different one of said plurality of data images;
   forming a directory image reciting each of said plurality of identifiers;
   encoding said directory image in a non-holographic data storage medium;
   displaying said directory image on a spatial light modulator;
   generating a reference beam using a lasing device, wherein said reference beam comprises an original reference beam intensity;
   generating a carrier beam using said lasing device;
   directing said carrier beam onto said spatial light modulator to form a data beam comprising said directory image;
   interacting said reference beam and said carrier beam to form a directory hologram comprising said directory image;
   encoding said directory hologram in said holographic data storage medium;
   illuminating said encoded directory hologram with said reference beam to generate a reconstructed directory image;
   evaluating said encoded directory hologram by comparing said reconstructed directory image with an encoded directory image;
   establishing a threshold correlation factor;
   determining a measured correlation factor by comparing said reconstructed directory image with said encoded directory image;
   determining if said measured correlation factor is greater than said threshold correlation factor;
   operative if said measured correlation factor is greater than said threshold correlation factor, verifying said encoded directory hologram;
   illuminating said encoded directory hologram with said data beam to generate a reconstructed reference beam comprising a reconstructed reference beam intensity;
   evaluating said encoded directory hologram by comparing said original reference beam intensity with said reconstructed reference beam intensity;
   establishing a threshold intensity ratio;
   determining a measured intensity ratio by dividing said reconstructed reference beam intensity by said original reference beam intensity;

determining if said measured intensity ratio is greater than said threshold intensity ratio;

operative if said measured intensity ratio is greater than said threshold intensity ratio, verifying said encoded directory hologram.

2. The method of claim 1, further comprising the steps of:

determining for each of said holographically encoded data images a storage location;

wherein said forming step comprises forming a directory image reciting each of plurality of identifiers, wherein a storage address is recited for each of said plurality of identifiers.

3. The method of claim 1, wherein said evaluating step comprises the steps of:

establishing a threshold correlation factor;

determining a measured correlation factor by comparing said reconstructed directory image with said encoded directory image;

determining if said measured correlation factor is greater than said threshold correlation factor;

operative if said measured correlation factor is greater than said threshold correlation factor, verifying said encoded directory hologram.

4. The method of claim 1, wherein said measured intensity ratio is not greater than said threshold intensity ratio, further comprising the step of overwriting said holographically encoded directory image.

5. The method of claim 1, further comprising the steps of:

determining that a designated holographically encoded data image should not be used;

locating said designated holographically encoded data image;

overwriting said designated holographically encoded data image.

6. The method of claim 5, wherein said designated holographically encoded data image was holographically encoded using a carrier beam, further comprising generating said carrier beam;

illuminating seriatim each holographically encoded data image until an a reconstructed reference beam is generated.

7. The method of claim 6, further comprising the step of establishing a threshold reconstructed data beam intensity;

wherein said illuminating step further comprises illuminating seriatim each holographically encoded data image until a reconstructed reference beam is generated comprising an intensity greater than said threshold reconstructed data beam intensity.

* * * * *